United States Patent
Krause

[11] Patent Number: 5,136,591
[45] Date of Patent: Aug. 4, 1992

[54] MEASURING METHOD AND DEVICE FOR FAULT ANALYSIS OF DIGITAL TRANSMISSION PATHS

[75] Inventor: Klaus Krause, Berlin, Fed. Rep. of Germany

[73] Assignee: Siemens Aktiengesellschaft, Berlin & Munich, Fed. Rep. of Germany

[21] Appl. No.: 490,682

[22] PCT Filed: Sep. 7, 1988

[86] PCT No.: PCT/DE88/00560
§ 371 Date: Mar. 27, 1990
§ 102(e) Date: Mar. 27, 1990

[87] PCT Pub. No.: WO89/03142
PCT Pub. Date: Apr. 6, 1989

[30] Foreign Application Priority Data

Sep. 29, 1987 [DE] Fed. Rep. of Germany ....... 3733278

[51] Int. Cl.⁵ .......................... G06F 11/00; H04L 1/20
[52] U.S. Cl. ..................................... 371/20.4; 371/5.1; 375/10
[58] Field of Search ........................ 371/5.1, 20.4, 27; 375/10

[56] References Cited

U.S. PATENT DOCUMENTS

| | | | |
|---|---|---|---|
| 3,596,245 | 7/1971 | Finnie et al. | 371/20.4 |
| 3,689,884 | 9/1972 | Tew, Jr. | 371/20.4 |
| 3,956,601 | 5/1976 | Harris et al. | 371/20.4 |
| 3,971,920 | 7/1976 | Johnson | 364/200 |
| 4,022,988 | 5/1977 | Lentz et al. | 371/20.4 |
| 4,580,274 | 4/1986 | Debany, Jr. et al. | 375/10 |
| 4,688,207 | 8/1987 | Yoshimoto | 370/13 |

FOREIGN PATENT DOCUMENTS 1153822  5/1969  United Kingdom.

*Primary Examiner*—Charles E. Atkinson
*Attorney, Agent, or Firm*—Kenyon & Kenyon

[57] ABSTRACT

Bit error pattern analyses which supply information about the number and location of transmission errors have heretofore been carried out only at transmission speeds which permit instant processing of the bit sequences. At higher transmission speeds only quantitative statements (bit error rate) are made. According to the invention, at very high error occurrences (FA) and transmission speeds (up to 565 Mbits/s), the bit error pattern (BFS) is completely stored by a serial/parallel conversion with a serial/parallel demultiplexer (25). The reconversion of the bits ($b_0, \ldots, b_n$) to the time-correct order of their appearance for the evaluator (A) is effected by appropriate wiring of a temporary memory (Z) with a main memory (H).

13 Claims, 4 Drawing Sheets

|  | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| SR 0 | $b_0$ | $b_8$ | $b_{16}$ | $b_{24}$ | $b_{32}$ | $b_{40}$ | $b_{48}$ | $b_{56}$ | $b_{64}$ | $b_{72}$ | $b_{80}$ | $b_{88}$ | $b_{96}$ | $b_{104}$ | $b_{112}$ | $b_{120}$ |
| SR 1 | $b_1$ | $b_9$ | ⋮ | ⋮ | ⋮ | ⋮ | ⋮ | ⋮ | ⋮ | ⋮ | ⋮ | ⋮ | ⋮ | ⋮ | ⋮ | $b_{121}$ |
| SR 2 | $b_2$ | $b_{10}$ | ⋮ | ⋮ | ⋮ | ⋮ | ⋮ | ⋮ | ⋮ | ⋮ | ⋮ | ⋮ | ⋮ | ⋮ | ⋮ | $b_{122}$ |
| SR 3 | $b_3$ | $b_{11}$ | ⋮ | ⋮ | ⋮ | ⋮ | ⋮ | ⋮ | ⋮ | ⋮ | ⋮ | ⋮ | ⋮ | ⋮ | ⋮ | $b_{123}$ |
| SR 4 | $b_4$ | $b_{12}$ | ⋮ | ⋮ | ⋮ | ⋮ | ⋮ | ⋮ | ⋮ | ⋮ | ⋮ | ⋮ | ⋮ | ⋮ | ⋮ | $b_{124}$ |
| SR 5 | $b_5$ | $b_{13}$ | ⋮ | ⋮ | ⋮ | ⋮ | ⋮ | ⋮ | ⋮ | ⋮ | ⋮ | ⋮ | ⋮ | ⋮ | ⋮ | $b_{125}$ |
| SR 6 | $b_6$ | $b_{14}$ | ⋮ | ⋮ | ⋮ | ⋮ | ⋮ | ⋮ | ⋮ | ⋮ | ⋮ | ⋮ | ⋮ | ⋮ | ⋮ | $b_{126}$ |
| SR 7 | $b_7$ | $b_{15}$ | $b_{23}$ | $b_{31}$ | $b_{39}$ | $b_{47}$ | $b_{55}$ | $b_{63}$ | $b_{71}$ | $b_{79}$ | $b_{87}$ | $b_{95}$ | $b_{103}$ | $b_{111}$ | $b_{119}$ | $b_{127}$ |

BIT POSITIONS IN SHIFT REGISTER

SHIFT REGISTER

FIG. 3

| MEMORY BLOCK | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| | | | | | $\{b_0,...,$ | $b_7$ FROM $ZS_1$ | | | | | $\{b_8,...,$ | $b_{15}$ FROM $ZS_2$ | | | | |
| RAM 0 | SR0F | SR1F | SR2F | SR3F | SR4F | SR5F | SR6F | SR7F | SR0E | SR1E | SR2E | SR3E | SR4E | SR5E | SR6E | SR7E |
| RAM 1 | SR0D | SR1D | SR2D | SR3D | SR4D | SR5D | SR6D | SR7D | SR0C | SR1C | SR2C | SR3C | SR4C | SR5C | SR6C | SR7C |
| RAM 2 | SR0B | ...B | ...B | ...B | ...B | ...B | ...B | ...B | ...A | ...A | ...A | ...A | ...A | ...A | ...A | SR7A |
| RAM 3 | SR09 | ...9 | ...9 | ...9 | ...9 | ...9 | ...9 | ...9 | ...8 | ...8 | ...8 | ...8 | ...8 | ...8 | ...8 | SR78 |
| RAM 4 | SR07 | ...7 | ...7 | SR37 | ...7 | ...7 | ...7 | ...7 | ...6 | ...6 | ...6 | ...6 | ...6 | ...6 | ...6 | SR76 |
| RAM 5 | SR05 | ...5 | ...5 | ...5 | ...5 | ...5 | ...5 | ...5 | ...4 | ...4 | ...4 | ...4 | ...4 | ...4 | ...4 | SR74 |
| RAM 6 | SR03 | ...3 | ...3 | ...3 | ...3 | ...3 | ...3 | ...3 | ...2 | ...2 | ...2 | ...2 | ...2 | ...2 | ...2 | SR72 |
| RAM 7 | SR01 | ...1 | ...1 | ...1 | ...1 | ...1 | ...1 | ...1 | ...0 | ...0 | ...0 | ...0 | ...0 | ...0 | ...0 | SR70 |
| | $\{b_{112},...,$ | | | | | | $b_{119}$ FROM $ZS_{15}$ | | | | | $\{b_{120},...,$ | | | $b_{127}$ FROM $ZS_{16}$ | |

BIT POSITIONS IN MEMORY BLOCK

FIG. 4

MEASURING METHOD AND DEVICE FOR FAULT ANALYSIS OF DIGITAL TRANSMISSION PATHS

BACKGROUND OF THE INVENTION

By the fault analysis of digital transmission paths, the influence of faults on the transmission paths is detected. Faults in the transmission of binary data have the effect that a transmitted logic "1" is received as "0" and vice versa. Such transmission errors are recognized through fault analysis in pulse code-modulated (PCM) systems by comparison of a received serial data stream with a transmitted data stream as reference data stream. Generally the transmitted data stream consists of apparently random binary sequences (quasi-random sequences), which are generated for example by means of a regenerative shift register at the site of transmission and reception. Now if in the comparison of the received data stream with the reference data stream bits transmitted error-free are marked by a "0" and bits transmitted wrong by a "1", one obtains at the output of the transmission path the "bit error pattern." In the evaluation of such bit error patterns it is then possible, for one thing, by simply viewing them, to recognize sensitive points of the transmission line relative to certain transmission patterns, and for another, by further processing of the bit error pattern in mathematical algorithms, statements can be made about stochastic and systematic transmission errors for determining the causes thereof.

SUMMARY OF THE INVENTION

The invention relates to a measuring method for fault analysis of digital transmission paths by detection of a bit error pattern, produced at the output of the respective transmission path, which in the error analysis is applied to an evaluator, with a first measuring mode dependent error occurrence in the bit error pattern, in which
   the bit error pattern is combined to data blocks in a counter unit and
   the data blocks are stored for adaptation to the access times for the evaluation device,
and with
a second measuring mode dependent on error occurrence in the bit error pattern,
   switched to from the first measuring mode upon full utilization of the storing of the data blocks up to their unloading.

Such a measuring method is known for example from the paper "Detection of error pattern in the transmission of digital signals" read by Ernst Russ (Research Institute of the German Federal Postal Service) on the occasion of the "Third International Zurich Seminar on Digital Communication" in 1974 (published in "1974 International Zurich Seminar on Digital Communications, 12th-15th March 1974 Proceedings"). In this measuring method, error bits and error-free bits of the observed bit error pattern as counted in the first measuring mode within the counter unit with a first counter, the division into count sections occurring as a function of the alternation between error bits and error-free bits. The length of the individual count sections is recorded in a second counter belonging to the counter unit. The bit error pattern is thus combined to data blocks which contain information about the number and location of the transmitted error bits and error-free bits. When all counter digits of the first counter are occupied, output of its reading together with the reading of the second counter to a recirculating memory is brought about. This recirculating memory causes adaptation of the data transmission rate to the evaluation rate. When this recirculating memory is fully loaded, switching from the first to the second measuring mode takes place, in which, however, only a bit error count takes place, until the recirculating memory has been completely emptied. In the second measuring mode, therefore, only purely quantitative statements can be made (bit error rate), there is not information about the location of the individual error bits in the bit error pattern. Moreover, the known measuring method is suitable only for relatively low data transmission speeds, as the individual bits are always counted, pushed serially into the recirculating memory, and transported therein. Faster transmission speed exceed this processing speed.

As distinguished therefrom, the measuring method according to the invention is characterized in that
in the first measuring mode, the error free spaces appearing in the bit error pattern are counted as data blocks into several counters arranged parallel side by side as a counter unit, where
   upon each appearing bit error switching takes place from one counter to the adjacent counter,
and that
the second measuring mode is switched to when the counting of the error free spaces as data blocks in the individual counters coincides with the access to the data blocks by the evaluator.

Advantageously the data reduction by formation of data blocks in the first measuring mode is carried out only when there is no danger that data could get lost. This, however, depends on error occurrence in the bit error pattern. At a low error occurrence switching from one counter to the next is done much more rarely than at a high occurrence (especially in view of the possible high transmission speeds), so that at a low error occurrence the counter can take over the storage function at the same time. Due to the parallel arrangement of the counters to each other, in fact, they serve at the same time for storage, as reading into one of the counters from which read-out does not take place just then is always possible. This counter then maintains its reading or status up to read-out. In data reduction it suffices to count in only the error free spaces, which, however, may have zero length, which means that two error bits lie next to each other in the bit error pattern. Only when read-in would overlap read-out, i.e. when due to high error occurrence there would have to be reading precisely into that counter from which read-out occurs just then, the measuring method according to the invention switches to the second measuring mode. By this sequence one obtains a simple, but reliable switching condition which guarantees that at no time are data lost.

Another organization of the initially stated measuring method provides, according to the invention, that
in the second measuring mode the bit sequences of the bit error pattern are divided into time slices,
the bits lying in one time slice are temporarily stored parallel in time in a temporary memory,
upon full loading of the temporary memory all temporarily stored bits are transferred parallel in time into a main memory,
the bits from successive time slices being deposited in the main memory side by side,
and that at the latest upon full loading of the main memory the stored bits are supplied to the evaluator in the time-serial order of the appearance of the bit sequences in the bit error pattern.

The main advantage of this measuring method according to the invention is that even at very high transmission speeds to, for example, 565 megabits per second, the bit error pattern is picked up completely. The information about the location of the error bits in the bit error pattern—in addition to that about their number—is thus made available continuously even at very high transmission speeds. Within the second measuring mode, the individual bits of the bit error pattern are no longer combined to data blocks in the measuring method of the invention, but are stored directly, i.e. unchanged. A prerequisite for this is, of course, that the storing can take place quickly enough and with a great enough storage capacity. Therefore, the storing takes place after a serial/parallel conversion of the transmitted bit sequences of the bit error pattern by means of a temporary and a main memory. These are coupled so that the bits stored in parallel from the serial bit sequence can be read out of the main memory in correct time sequence, the read-out depending only on the evaluation rate, so that the main memory acts as a buffer.

In another form of realization of the measuring method according to the invention, both measuring modes may be combined in one measuring process. This results in optimum pattern adaptation with respect to the program flow and selection of the required components.

A measuring device for carrying out the measuring method according to the invention can advantageously be designed in such a way that
the main memory has a storage capacity of 1 Mbytes, and
is composed of eight parallelly addressable memory blocks, each with equal storage capacities and with a word length of 16 bits,
each memory block in turn consisting of four write-read memories.

Of advantage in this respect is, for one thing, that the main memory with a storage capacity of 1 Mbytes is able to record an extensive bit error pattern, which accordingly permits reliable statements about the error behavior of the transmission path. Such information bit error pattern is produced as a rule with quasi-random sequences as transmission signals generated by means of a regenerative shift register 23 bits long. Such a random sequence repeats only after $2^{23}-1$ bits (and hence is 1 Mbyte long) and represents to "white noise". Due to the normal storage rate obtained by the serial/parallel conversion, the main memory can be realized with commercial components (CMOS-RAMs). This is supported also by the fact that only an ordinary word length of 16 bits is required for the individual memory blocks.

According to another organization of the measuring device according to the invention,
the division of the serially appearing bit sequences of the bit error pattern is made with a serial/parallel demultiplexer with a time division of 1:8, so that within each time slice there are always eight bits of the bit sequences.

Such a serial/parallel demultiplexer permits the recording of a bit error pattern even at very high transmission speeds. Here again this may be a commercial component, belonging to the class of extremely high speed components. The function of this demultiplexer is always to combine eight serially successive bits as one byte and to send them on in parallel. This is achieved in that the operating cycle of the demultiplexer is one eighth of the transmission cycle. This bring about a scaling down of the processing cycle which permits further processing (deposition and evaluation) of the bits with the commercial memory and computling modules.

The eight bits collected by the serial/parallel demultiplexer within a time slice are delivered to the temporary memory. The latter consists, according to another organization of the measuring device of the invention, of eight shift registers, each with a word length of 16 bits. These, too, may be commercial modules.

If the temporary memory consists advantageously of eight 16-bit shift registers and the main memory of eight 16-bit memory blocks, these are coupled in parallel, according to a further organization of the measuring device of the invention, via a data bus with 128 lines, in such a way that the bits always temporarily stored in two successive time slices are deposited side by side in a memory block. The method according to the invention can thus be carried out with the aid of a simple hardware conception with a corresponding measuring device. Costly software solutions are not necessary.

According to another advantageous organization of the measuring device of the invention, it is provided that
the counter unit active in the first measuring mode has
four counter chains as counters, which
consist in each instance of a time base prescaler and a time base main counter, and which
are activated via an input multiplexer.

Four parallel counter chains are sufficient to work down bit error patterns at transmission rates up to 565 megabits per second. In the range of high transmission frequencies, the time base prescalers count the low-order bits and store them as a number. The time base main counters count the higher-order bits and store this number also, until they together are called up from the evaluator by the time base prescalers with the respective number.

The switching between the counter chains via an input multiplexer permits simultaneous counting and processing.

According to a further design of the measuring device for carrying out the method according to the invention, switching between the two measuring modes occurs via an interrupt circuit component. Such a circuit component, too, has a simple hardware conception and brings about the always reliable switching between the two measuring modes. At the same time, by the occurrence of an interrupt command, the evaluator is caused to place a corresponding marker at the point of interruption in the first measuring mode and to return to this point automatically after the second measuring mode has been worked down. This is the case when the occurring error frequency again permits detection of the bit error pattern with simultaneous data reduction.

BRIEF DESCRIPTION OF THE DRAWINGS

The measuring method according to the invention and an especially preferred form of a measuring device for carrying out the method are explained more specifically below with reference to the figures. They show FIG. 1, the measuring method of the invention in basic representation in the form of a signal flow diagram;

FIG. 3, a bit position matrix for the temporary memory; and

FIG. 4, a bit position matrix for the main memory in connection with the bit space allocation matrix for the main memory in connection with the bit space allocation of the temporary memory per FIG. 3.

DETAILED DESCRIPTION

Figure 1:
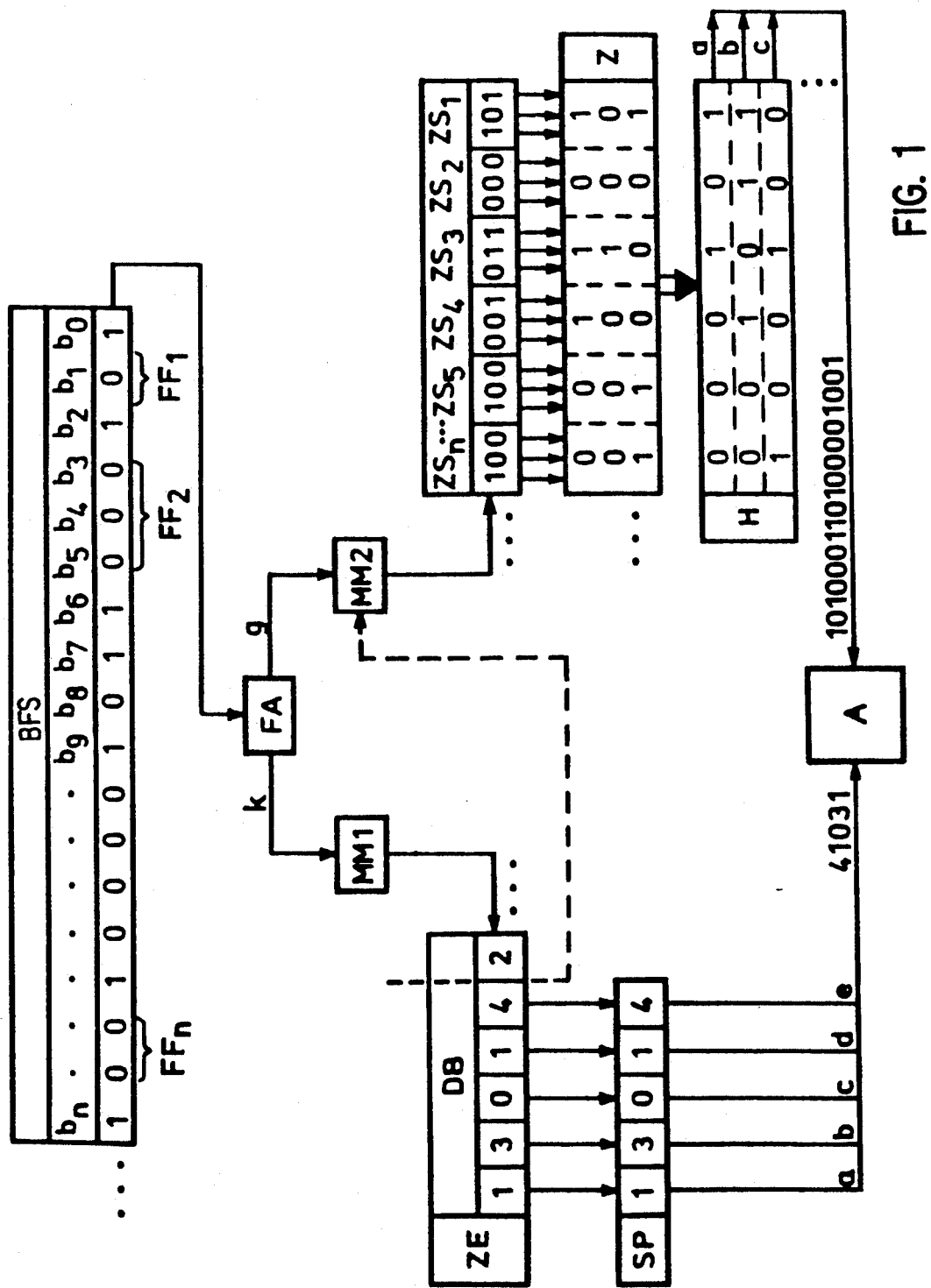

In FIG. 1 is shown in the top portion a bit error pattern BFS produced at the output of a transmission path not shown, to be analyzed for faults, with a bit sequence $b_0 \ldots b_n$ with the individual bits $b_0, \ldots, b_n$. The entire bit error pattern BFS consists of the individual bits $b_0, \ldots b_5$. The bit sequence $b_0 \ldots b_n$ has a length of $2^{23} -1$ bits, because in the chosen embodiment the transmission signal is formed by quasi-random sequences. This bit sequence $b_0 \ldots b_n$ can repeat any number of times with formation of the bit error pattern BFS. The bit error pattern BFS is characterized by error free spaces $FF_1, \ldots, FF_n$, which are formed by successive error-free bits, in FIG. 1 for example the "0" bits $b_3$, $b_4$ and $b_5$, between two faulty "1" bits $b_2$ and $b_6$. The error free space $FF_2$ thus has the length of 3 bits. Depending on an error occurrence FA within the bit error BFS determined by the number and length of the error free spaces $FF_1, \ldots, FF_n$, the bit error pattern is now processed in a first measuring mode MM1 or in a second measuring mode MM2. The finding whether a small (k) or a large (g) error occurrence FA is involved, however, is always obtained with the first measuring mode.

In the first measuring mode MM1, in fact, the bit error pattern BFS is combined in a counter unit ZE to data blocks DB, in that the error free spaces $FF_1, \ldots, FF_n$ are counted. In the embodiment shown, the error free spaces $FF_1, \ldots, FF_n$, are, starting with the bit $b_0$, for example 1, 3, 0, 1, 4 and 2 bits long. The respective data blocks DB with the numerical values 1, 3, 0, 1, 4 and 2 are then temporarily stored in a memory SP for adaptation to the access rate of an evaluator A and—according to the order a, b, c . . . indicated in FIG. 1—are read into the evaluator A. When memory SP is loaded to capacity—in the chosen embodiment only five data blocks DB can be stored, so that the data block DB with the number "2" can no longer be taken over into memory SP (which means that the error occurrence FA has become too great for processing in the first measuring mode MM1) -, switching to a second measuring mode MM2 takes place.

In this second measuring mode MM2, first the produced bit error pattern BFS is divided into individual time slices $ZS_1, \ldots, ZS_n$. The duration of the individual time slices $ZS_1, \ldots, ZS_n$ is determined by the dividing component (not shown in FIG. 1). In the chosen embodiment, for example, each time slice $ZS_1, \ldots, ZS_n$ contains three bits $b_0$, $b_1$, $b_2$; $b_3$, $b_4$ $b_5$; . . . ; $b_{n-2}$, $b_{n-1}$, $b_n$. After the division, always the three bits $b_0$, $b_1$, $b_2$; $b_3$, $b_4$ $b_5$; . . . ; $b_{n-2}$, $b_{n-1}$, $b_n$ collected in a time slice $ZS_1, \ldots, ZS_n$ are transferred in parallel to a temporary memory Z. The latter, therefore, contains a corresponding number of parallelly addressable addresses. By such a conversion of bits $b_0, \ldots, b_n$ occurring serially very quickly into bits $b_0$, $b_1$, $b_2$; $b_3$, $b_4$ $b_5$; . . . ; $b_{n-2}$, $b_{n-1}$, $b_n$ to be transferred parallelly, a reduction of the subsequently necessary processing speed is achieved. In the present example this speed is now only one third the transmission rate of the bits $b_0, \ldots, b_n$ of the bit error pattern BFS. This makes it possible to store the bit error pattern BFS with normal memory elements.

When the temporary memory Z is fully loaded, it delivers all stored bits $b_0, \ldots, b_n$ concurrently to a main memory H, whose capacity is a multiple of that of the temporary memory Z. The temporary memory Z is wired to the main memory H in such a way that the bits $b_0$, $b_1$, $b_2$; $b_3$, $b_4$ $b_5$; . . . ; $b_{n-2}$, $b_{n-1}$, $b_n$ stored parallelly in the temporary memory Z are again strung together in the time-correct order when being transferred to the main memory H. Read-out from the main memory H occurs accordingly in the order (indicated in FIG. 1 by a, b and c) such that the bit error pattern BFS can be supplied to the evaluator A in its correct time sequence.

Figure 2:
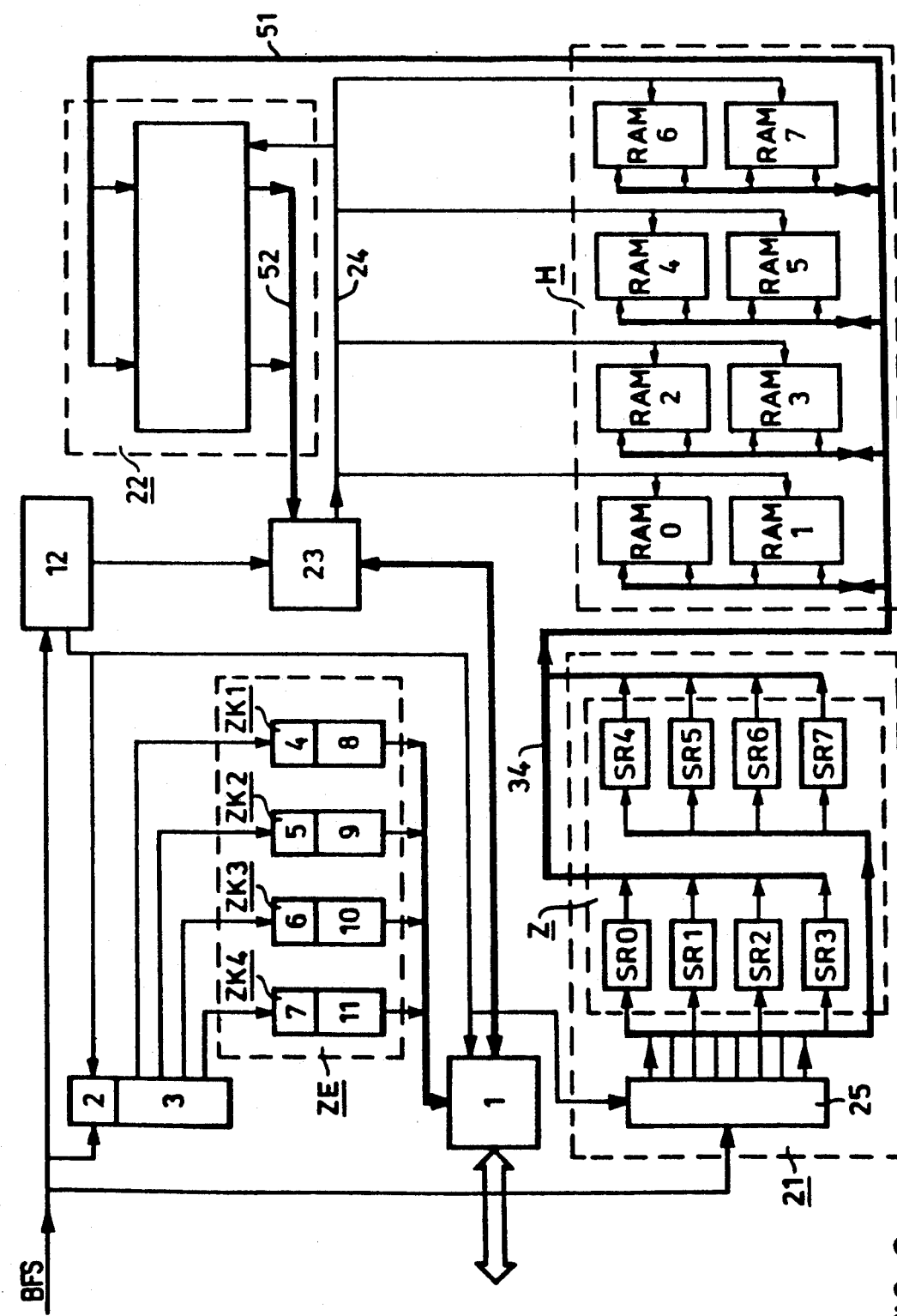
FIG. 2, a measuring device of the invention for carrying out the method of the invention, in basic representation in the form of a block diagram.

In FIG. 2 is shown an advantageous example of realization of a measuring device for carrying out the method according to the invention. For greater clarity, control clock lines are omitted and address lines are shown only to the extent necessary. The core of this measuring device is a first computer 1, which forms part of the evaluator A and is controlled by a central unit not shown in detail, which takes over the display and output of the data determined by the first computer 1. This control is represented in FIG. 2 by the large double arrow at left.

For the detection of long error free spaces $FF_1 \ldots, FF_n$ (see FIG. 1) the measuring method according to the invention operates—as has been explained before—in the first measuring mode MM1 (see FIG. 1). To this end, the bit error pattern BFs is supplied via a gate circuit 2 to an input multiplexer 3. With the gate circuit 2, the individual bits $b_0, \ldots, b_n$ of the bit error patterns BFS are switched through to the input multiplexer 3 in the distribution necessary for the particular measuring mode. The different measuring modes may be, besides the bit error pattern record according to the measuring method of the invention, also for example the determination of error quotas in the form of linear and exponential mean values or the determination of error counts in the form of error sums over certain measuring times or error growth rates.

Downstream of the input multiplexer 3 are connected four counter chains $ZK_1, \ldots, ZK_4$ arranged parallel to each other and forming the counter unit ZE, each composed of a time base prescaler 4, 5, 6 and 7 (for example: in each instance 2 hexadecimal counters Model 10 H 136, ECL (emitter coupled logic) technology, Motorola, data book 1982/1983) and a time base main counter 8, 9, 10 and 11 (for example: Model 82 C 54, Intel, Microcomputer components data book, 1985). The prescalers and main counters may also be designed as cost-efficient "gate array" version. The time base prescalers 4, . . . 7 are necessary for very high frequencies in order to scale them down accordingly. They indicate quasi the low-order bits in the count of the error free spaces $FF_1 \ldots, FF_n$, while the time base main counters 8, . . ., 11 count the higher-order ones. Taking, for example, a pulse code-modulated transmission line with a transmission frequency of 140 Mbits/s and an assumed processing time of the first computer 1 of 20/µs, it is possible to process with four parallel counter chains $ZK_1, \ldots, ZK_n$ bit error patterns BFS in which the individual bit errors occur in a period greater than 80/µs. If, in fact, when a bit error occurs switching takes place, via the input multiplexer 3 which permits simultaneous read-in and read-out, for example from counter chain $ZK_1$ to counter chain $ZK_2$ and then to counter chain $ZK_3$, this is possible as long as the first computer 1 does to just then read out from the last addressed counter chain $ZK_01 \ldots, ZK_4$.

If read-out and read-in overlap, according to the invention the second measuring mode MM2 (see FIG. 1) is switched to. Such overlap of read-in and read-out is detected by an interrupt circuit component 12. It brings about by means of a hardware command that the first computer 1 interrupts the read-out from the respective counter chain $ZK_1, \ldots, ZK_4$, the first computer 1 placing at the point of interruption a marker, in order to be able later to resume read-out at this point. Measuring mode MM1 is not taken up again until the error occurrence FA (see FIG. 1) again permits detection with the first computer 1 in the form of data blocks DB.

If, therefore, the case arises that short error free spaces $FF_1, \ldots, FF_n$ turn up in quick succession in the bit error pattern BFS, the system switches from measuring mode MM1 to the second measuring mode MM2 and continues to operate in another part of the measuring device. This other part of the measuring device consists essentially of four function blocks: a serial/parallel conversion block 21, the main memory H, a line driver block 22, and a second computer 23 which controls the main memory H and the line driver block 22 via address lines 24 and which corresponds to the first computer 1. Also the second computer 23 is part of the evaluator A.

The serial/parallel conversion block 21 consists firstly of a serial/parallel demultiplexer 25 having a word width of eight bits, and secondly of the temporary memory Z. This demultiplexer 25 is for example a high-speed module in gallium arsenide technology for adaptation to very high transmission rates up to 565 Mbits/s (for Example: 1:8 time division demultiplexer/serial to parallel converter 10 G 041, 10 G Pico Logic TM Family, by GibaBit Logic, Newbury Park, Preliminary 10 G 041 11/85, p. 1-12). It is the function of the demultiplexer 25 always to combine eight successive bits in the bit error pattern BFS to one byte, passing them on in parallel. The demultiplexer 25 thus forms time slices $ZS_1, \ldots, ZS_n$, each containing eight individual bits. In a PCM system with a transmission rate of 565 Mbits/s, therefore, a relay process now occurs only every 14 ns. The retransmission of the eight individual bits combined in one byte occurs parallel to the temporary memory Z, which consists of eight shift registers SR0, ..., SR7. These shift registers SR0, ..., SR7 are, because of the reduced processing speed, commercial modules and have a word length of sixteen bits, so that a total of sixteen bytes can be temporarily stored in the shift registers SR0, ..., SR7 (for example: shift register 74 F 675, Fast-TTL module, data book "Fast Fairchild Advanced Schottky - TTL", chapter 4, p. 525 ff., 1985).

As a transfer of the data from the serial/parallel demultiplexer 25 to the shift registers SR0, ..., SR7 takes place every 14 ns and sixteen times in all, the shift registers SR0, ..., SR7 are fully loaded after 224 ns, so that their content must be transferred to the main memory H. For such a write cycle of a length of over 200 ns this main memory H may be composed of commercial write-read memories (for example: Highspeed status CMOS-RAM HM 62256 P - 10, by Hitachi, data book "IC-Memory Data Book", 1985). As the data are transferred from the shift registers SR0, ..., SR7 to the main memory H in parallel, a data bus 34 connects the two with a total of 128 lines. The data transmission is brought about by line drivers to shown in detail.

The size of the main memory H is 1 Mbyte. It is composed of eight memory blocks RAM 0, ..., RAM 7, of which each has a word width of sixteen bits and a memory depth of 64 k. Thus the total memory capacity is $2^{23} = 1$ Mbyte. Each individual memory block RAM 0, ..., RAM 7 consists of four commercial CMOS write-read memories not show in detail, each having a storage capacity of 32 kbytes (model see above). As each memory block RAM 0, ..., RAM 7 has a memory depth of 64 k, the content of the temporary memory Z can be transferred to the main memory H a total of 65,536 times. It is only then that the main memory H with its capacity of 1 Mbyte is fully loaded.

The wiring of the shift registers SR0, ..., SR7 with the memory blocks RAM 0, ..., RAM 7 of the main memory H is effected so that always the bits of two successive time slices $ZS_1, \ldots, ZS_n$ are deposited one after the other in a memory block RAM 0, ..., RAM 7. For further remarks concerning this see the explanations of FIGS. 3 and 4. By this wiring it is achieved that upon read-out of the data from the main memory into the second computer 23 via the line driver block 22 not shown in greater detail and an additional data bus 51, 52, the individual bits are processed in the order of their appearance in the bit error pattern BFS. Thus a chronologically correct processing of the individual bits $b_0, \ldots, b_n$ of the bit error pattern BFS becomes possible despite high transmission rates of up to 565 Mbits/s without losing the information about the location of the individual errors in the bit error pattern BFS.

The second computer 23 is not illustrated in greater detail in FIG. 2 as to its construction. Thus, the start for the evaluation of the bit error pattern BFS can be shifted at will in the memory region of the main memory H by an external trigger signal. Accordingly, any start address can be loaded. Furthermore, after the transfer of the data from the temporary memory Z to the main memory H is completed, the second computer 23 reads the data in via a write logic not shown. The latter may consist of a signal transmitter, a write signal transmitter, and an address counter. After read-in of the data, the second computer 23 can perform a data reduction in the form of counting the error free spaces $FF_1, \ldots, FF_n$.

FIG. 3 illustrates the distribution of the individual bits $b_0 \ldots, b_{128}$ of a bit sequence $b_0 \ldots, b_n$ in the individual bit positions 0 to F (16 bit word width) of the shift registers SR0, ..., SR7 as matrix. Horizontally are plotted the bit positions 0 to F and vertically the individual shift registers SR0 to SR7. As each individual shift register SR0, ..., SR7 is able to receive words of a width of 16 bits, a title of 128 bits can be deposited simultaneously in the eight shift registers SR0, ..., SR7. The distribution of the individual bits is such that the eight bits $b_0, \ldots b_7; \ldots b_8 \ldots b_{15}; \ldots; b_{111} \ldots b_{119}; b_{120} \ldots b_{127}$ present in the time slices $ZS_1, ZS_2 \ldots ZS_{15}, ZS_{16}$ are loaded parallelly into the shift registers SR0, ..., SR7. As the last time slice $ZS_{16}$ is being shifted in, the first eight bits $b_0, \ldots, b_7$ will then be at the bit position F in the shift registers SR0, ..., SR7, and the bits $B_{120}, \ldots, b_{127}$ of the last time slice $ZS_{16}$ at the bit position 0 in the shift registers SR0 ... SR7.

FIG. 4 shows schematically the wiring of the shift registers SR0, ..., SR7 with the individual memory blocks RAM 0, ..., RAM 7 of the main memory H in a matrix. Horizontally are plotted the bit positions 0 to F of the memory blocks RAM 0, ..., RAM 7, vertically the memory blocks 0 to F of the shift registers SR0, ..

., SR7, i.e. the wiring now occurs so that always the bits $b_0 \ldots b_7$; $b_8 \ldots b_{15}$; $b_{112} \ldots b_{119}$; $b_{120} \ldots b_{127}$ of two adjacent time slides $ZS_1$, $ZS_2$; ...; $ZS_{15}$, $ZS_{16}$ are arranged side by side in a memory block RAM 0 or RAM 7. The indexing for the occupation of the memory blocks RAM 0 ... RAM 7 with the content of the shift registers SR0, ..., SR7 is chosen so that to the designation of the shift register SR0, ..., SR7 there was appended that of the bit position 0 ... F. In RAM 4, for example, the bit $b_{67}$ from the shift register SR3 of bit position 7 (SR37) is deposited at bit position 0.

If we not transfer the bits $b_0, \ldots, b_{127}$ of the individual shift registers SR0, ..., SR7, we see that in RAM 0 are deposited the bits $b_0, \ldots, b_{15}$, in RAM 1 the bits $b_{16}, \ldots b_{31}$, etc., until finally in RAM 7 the bits $b_{112}, \ldots, b_{127}$ are deposited side by side. Each memory block RAM 0 to RAM 7 is thus loaded with a first word, consisting of sixteen bits. In accordance with the above explanations, thereafter each memory block RAM 0, ..., RAM 7 is loaded in the same manner with a second word of a word length of 16 bits from the shift registers SR0, ..., SR7, so that the bits $b_{128}, \ldots, b_{255}$ can be stored. This can be continued until 65,536 words equivalent to 64 k have been deposited in each memory block RAM 0, ..., RAM 7, so that the capacity of 1 Mbyte of the main memory H is fully utilized.

What is claimed is:

1. A method for performing fault analysis on a bit error pattern produced at an output of a digital transmission path, comprising the steps of:
   a) supplying the bit error pattern to a first measuring mode of an evaluator;
   b) forming a plurality of data blocks by counting a length of each error free interval with a plurality of counters arranged in parallel, each data block representing the length of an error free interval, whereby counting switches from one counter to an adjacent counter upon appearance of a bit error;
   c) storing each data bock in a memory for access by the evaluator; and
   d) switching to a second measuring mode of the evaluator when the evaluator cannot access the plurality of data blocks as fast as the plurality of data blocks are formed.

2. The method according to claim 1, wherein the second measuring mode further comprises the steps of:
   a) dividing a plurality of bits ($b_0, \ldots, b_n$) of the bit error pattern into a plurality of time slices ($ZS_1, \ldots, ZS_n$);
   b) storing a subset of said plurality of bits ($b_0, b_1, b_2; \ldots; b_{n-2}, b_{n-1}, b_n$) within each of the time slices in parallel in a temporary memory;
   c) transferring the bits of said time slices ($b_0, b_1, b_2; \ldots; b_{n-2}, b_{n-1}, b_n$) into a main memory when the temporary memory is full, wherein each subset of said plurality of bits ($b_0, b_1, b_2; \ldots; b_{n-2}, b_{n-1}, b_n$) is located adjacent to bits of a subset of said plurality of bits ($b_0, b_1, b_2; \ldots; b_{n-2}, b_{n-1}, b_n$) belonging to a successive time slice of the plurality of time slices ($ZS_1, \ldots, ZS_n$); and
   d) supplying the sunset of said plurality of bits ($b_0, b_1, b_2; \ldots; b_{n-2}, b_{n-1}, b_n$) stored in the main memory to the evaluator in time serial order of appearance of each of the second plurality of bits ($b_0, b_1, b_2; \ldots; b_{n-2}, b_{n-1}, b_n$) in the bit error pattern when the main memory is full.

3. A method for performing fault analysis on a bit error pattern produced at an output of a digital transmission path, comprising the steps of:
   a) supplying the bit error pattern to a first measuring mode an evaluator, said first measuring mode of the evaluator comprising the steps of;
      (i) forming a plurality of data blocks by counting a length of each error free interval with a plurality of counters arranged in parallel, each data block representing the length of an error free interval, whereby counting switches from one counter to an adjacent counter upon appearance of a bit error; and
      (ii) storing each data block in a memory for access by the evaluator; and
   b) supplying the bit error pattern to a second measuring mode of an evaluator when said memory becomes filled with said plurality of data blocks before said plurality of data blocks can be unloaded, said second measuring mode of the evaluator comprising the steps of:
      (i) dividing a plurality of bits ($b_0, \ldots, b_n$) of the bit error pattern into a plurality of time slices ($ZS_1, \ldots, ZS_n$);
      (ii) storing a subset of said plurality of bits ($b_0, b_1, b_2; \ldots; b_{n-2}, b_{n-1}, b_n$) within each of the time slices in parallel in a temporary memory;
      (iii) transferring the bits of said time slices ($b_0, b_1, b_2; \ldots; b_{n-2}, b_{n-1}, b_n$) into a main memory when the temporary memory is full, wherein each subset of said plurality of bits ($b_0, b_1, b_2; \ldots; b_{n-2}, b_{n-1}, b_n$) is located adjacent to bits of a subset of said plurality of bits ($b_0, b_1, b_2; \ldots; b_{n-2}, b_{n-1}, b_n$) belonging to a successive time slice of the plurality of time slices ($ZS_1, \ldots, ZS_n$); and
      (iv) supplying the subset of said plurality of bits ($b_0, b_1, b_2; \ldots; b_{n-2}, b_{n-1}, b_n$) stored in the main memory to the evaluator in time serial order of appearance of each of the second plurality of bits ($b_0, b_1, b_2; \ldots; b_{n-2}, b_{n-1}, b_n$) in the bit error pattern when the main memory is full.

4. An apparatus for performing fault analysis on a bit error pattern produced at an output of a digital transmission path, comprising:
   a) an evaluator;
   b) a first measuring device being coupled to the evaluator, receiving the bit error pattern, and including:
      (i) a counter unit being coupled to the first measuring device, including a plurality of counters arranged in parallel, said plurality of counters forming a plurality of data blocks by counting a length of each error free interval, each data block representing the length of an error free interval, whereby counting switches from one counter to an adjacent counter upon appearance of a bit error; and
      (ii) a first memory being coupled to said counter unit, storing each data block and being coupled to said evaluator, wherein the evaluator accesses the plurality of data blocks in said first memory; and
   c) a second measuring device being coupled to the evaluator and receiving the bit error pattern when the evaluator cannot access the plurality of data blocks as fast as the plurality of data blocks are formed.

5. The apparatus according to claim 4, wherein said second measuring device further comprises:
   a) a demultiplexer receiving the bit error pattern and dividing a plurality of bits ($b_0, \ldots, b_n$) of the bit error pattern into a plurality of time slices ($ZS_1, \ldots, ZS_n$);
   b) a temporary memory being coupled to the demultiplexer and storing a subset of said plurality of bits ($b_0, b_1, b_2; \ldots; b_{n-2}, b_{n-1}, b_n$) within each of the time slices ($ZS_1, \ldots, ZS_n$) in parallel;
   c) a main memory being coupled to the temporary memory and receiving the bits of said time slices ($b_0, b_1, b_2; \ldots; b_{n-2}, b_{n-1}, b_n$) when the temporary memory is full, wherein each subset of said plurality of bits is located adjacent to those bits belonging to a successive time slice of the plurality of time slices ($ZS_1, \ldots, ZS_n$), and said main memory supplies the bits of said time slices stored in the main memory to the evaluator in time serial order of appearance of each of subset of said plurality of bits ($b_0, b_1, b_2; \ldots; b_{n-2}, b_{n-1}, b_n$) in the bit error pattern when the main memory is full.

6. The apparatus according to claim 5, wherein said main memory comprises:
   a) a storage capacity of one megabyte; and
   b) eight memory blocks addressable in parallel, each of said eight memory blocks having equal storage capacity, a word length of 16 bits, and being comprised of four write-read memories.

7. The apparatus according to claim 6, wherein said demultiplexer comprises a serial/parallel demultiplexer performing a time division of one to eight (1:8), whereby eight bits of the plurality of bits ($b_0, \ldots, b_n$) always lie within each time slice of the plurality of time slices ($ZS_1, \ldots, ZS_n$).

8. The apparatus according to claim 6, wherein said temporary memory comprises eight shift registers, each having a word length of 16 bits.

9. The apparatus according to claim 8, further comprising a data bus having 128 parallel lines coupling said eight shift registers of the temporary memory to the eight memory blocks of the main memory, whereby a plurality of bits ($b_0 \ldots b_7; b_8 \ldots b_{15}; \ldots; b_{112} \ldots b_{119}; b_{120} \ldots b_{127}$) temporarily stored in the eight shift registers in said temporary memory are deposited side by side in said eight memory blocks always in two successive time slices ($ZS_1, ZS_2; \ldots; ZS_{15}, ZS_{16}$).

10. The apparatus according to claim 9, further comprising an input multiplexer receiving the bit error pattern, wherein said counter unit further comprises four counter chains being coupled to said input multiplexer, each of said four counter chains including a time base prescaler and a time base main counter activated by said input multiplexer.

11. An apparatus for performing fault analysis on a bit error pattern produced at an output of a digital transmission path, comprising:
   a) an evaluator having a first and a second computing element;
   b) an input multiplexer receiving the bit error pattern;
   c) a counter unit including a plurality of counters arranged in parallel, being coupled to the input multiplexer and forming a plurality of data blocks by counting a length of each error free interval with the plurality of counters arranged in parallel, each data block representing the length of an error free interval, whereby counting switches from one counter to an adjacent counter upon appearance of a bit error;
   d) a storage unit storing each data block for access by the evaluator;
   e) a serial/parallel demultiplexer diving a plurality of bits ($b_0, \ldots, b_n$) of the bit error pattern into a plurality of time slices ($ZS_1, \ldots, ZS_n$), wherein the bit error pattern is switchable between said input multiplexer and said serial/parallel demultiplexer when the evaluator cannot access the plurality of data blocks as fast as the plurality of data blocks are formed;
   f) a buffer storage being coupled to said serial/parallel demultiplexer storing a subset of aid plurality of bits ($b_0, b_1, b_2; \ldots; b_{n-2}, b_{n-1}, b_n$) within each of said time slices in parallel in a temporary memory;
   g) a main memory being coupled to the buffer storage and receiving the bits of said time slices ($b_0, b_1, b_2; \ldots; b_{n-2}, b_{n-1}, b_n$) when the buffer storage is full, wherein each subset of said plurality of bits is located adjacent to those bits belonging to a successive time slice of the plurality of time slices ($ZS_1, \ldots, ZS_n$);
   h) a line driver block being coupled between said memory and said first computing element and supplying the plurality of bits of said time slices stored in the main memory to the evaluator in time serial order of appearance of each said subset of said plurality of bits ($b_0, b_1, b_2; \ldots; b_{n-2}, b_{n-1}, b_n$) in the bit error pattern when the main memory is full; and
   i) an interrupt circuit element being coupled to the first computing element, whereby said interrupt circuit element activates the first computing element and deactivates the second computing element when the bit error pattern is switched between said input multiplexer and said serial/parallel demultiplexer.

12. The apparatus according to claim 11, wherein said serial/parallel demultiplexer performs a time division of one to eight (1:8) such that eight bits ($b_0 \ldots b_7; b_8 \ldots b_{15}; b_{n-7} \ldots b_n$) of the plurality of bits ($b_0 \ldots b_n$) always lie within each time slice ($ZS_1 \ldots ZS_n$).

13. The apparatus according to claim 11, wherein said plurality of counters of the counter unit comprise four counter chains ($ZS_1 \ldots ZS_4$) including:
   a) a time base prescaler;
   b) a time base main counter being coupled to the time base prescaler; and
   c) an input cane being coupled to the time base main counter and the time base prescaler and activating the time base scaler and the time base main counter.

* * * * *